Reissued Mar. 10, 1936 Re. 19,884

UNITED STATES PATENT OFFICE 19,884

HEAT TREATMENT OF STEEL RAILS

John Brunner, Chicago, Ill.

No Drawing. Original No. 1,925,029, dated August 29, 1933, Serial No. 662,839, March 25, 1933. Application for reissue June 18, 1935, Serial No. 27,277

8 Claims. (Cl. 148—12)

This invention relates to improvements in the manufacture of steel rails and similar rolled shapes and to all heavy rolled products of rail steel composition as hereinafter defined.

According to standard practice steel rails are rolled to a finished section and are then permitted to cool down to atmospheric temperature. The defect which has existed as a problem in this art is the occurrence of so-called shatter cracks, or internal thermal cracks, forming in the interior of the rail during the cooling after the rolling of the rail is completed. The existence of such shatter cracks may be determined by etching and by microscopic examination of a section taken longitudinally through the head of the rail. Such shatter cracks tend to enlarge and in service, may finally cause failure of the rail. Various methods have been resorted to in an attempt to prevent the occurrence of such shatter cracks but heretofore a cheap and efficient method has not been disclosed. The same problem of preventing internal thermal cracks is presented in other rolled products of rail steel composition and of thicknesses as great as those of ordinary rails.

In a former patent granted to me as No. 1,277,372, September 3, 1918, I have disclosed a method for finishing rails, having for its principal object the production of a fine grain structure in the interior of the rail head. According to this prior method the rail is rolled to a size slightly in excess of the finished rail. The rail is cooled to a temperature below the critical range, then reheated to a temperature above the critical range until the structure attains the fine grain and then the rail is rerolled to its finished section and allowed to cool on a hot bed. This former method was not directed to the prevention of shatter cracks but to the formation of a fine grain structure.

It is an object of the present improvements to disclose a method according to which a finished rail or similar product, having a fine grain structure with great toughness and without the existence of shatter cracks, may be obtained.

Specifically it is an object of the present invention to finish the product by the following method:—The product is rolled to its finished section; cooled to a temperature below the thermal critical range; reheated to a temperature above the thermal critical range and then cooled, either naturally or by regulated cooling until it reaches atmospheric temperature.

The treatment herein described is applicable to rails and equivalent products having a composition substantially within the following ranges:

| | |
|---|---|
| Carbon between | 0.20% and 0.90% |
| Manganese between | 0.30% and 1.60% |
| Phosphorus not over | 0.08% |
| Sulphur not over | 0.08% |
| Silicon not over | 2.00% |
| Chromium not over | 3.00% |

and other chemical elements may be added as de-oxidizers or strengtheners of the steel. It is to be understod that the chemical composition is to be adjusted to best suit the particular rolled product to be treated and the intended service of the same. A specific instance in the manufacture of rails, for example, is as follows:—

The rails leave the finishing rolls at a temperature approximately 925° C. to 1065° C. The rails are transferred to a hot bed and cooled either naturally or by regulated air cooling to a temperature just below the thermal critical range or temperature of recalescence. The exact temperature will vary in accordance with the chemical composition of the steel but it may be approximately stated as 500° C. to 700° C. The rails are then transferred to a reheating furnace, where the temperature is slowly raised to a point slightly above the upper limit of the thermal critical range which may be stated as approximately 800° to 850° C. The rails taken from the furnace are again transferred to a hot bed where they are cooled, either naturally or by regulated cooling, down to atmospheric temperature. The rate at which the cooling and reheating steps are carried out is variable, depending upon the composition of the rail, the section of the rail and weather conditions, but it may be understood that the period from the time the rails leave the finishing rolls until they finally reach approximately atmospheric temperature may require several hours.

By the treatment herein described I prevent the formation of so-called shatter cracks in the interior during the cooling by the removal or equalizing of internal stresses and strains incident to the cooling operation. The treatment effects a refinement of the internal grain structure and increases the uniformity and toughness thereof. Furthermore, it is important to note that the treatment described is carried out on the finished rail product so that no subsequent heating due to further rolling takes place. Therefore, there is no possibility of further changes in the grain structure or danger of formation of shatter cracks.

Patent No. 1,929,029 of which this application is a reissue, matured from a continuation-in-part application of application Serial No. 632,087, filed September 7, 1932, correcting an inadvertent error in the first filed application in stating the analysis of the rail steel composition.

By the term "heavy rolled products" I mean to include all products of rail steel composition as above defined and of such thickness, generally an inch and one-half or more, as to present problems substantially the same as those involved in rail heads.

I claim:

1. The method of treating steel rails which consists in rolling the rails to finished sections, cooling the rails from their rolling temperature to a point only slightly below the thermal critical range, reheating the rails to a point slightly above the thermal critical range and cooling the rails to atmospheric temperatures.

2. The method of manufacturing steel rails which consists in rolling the rails to finished sections, cooling the rails from the rolling temperature to below the thermal critical range, reheating the rails before the rails have reached atmospheric temperature to above the thermal critical range and subsequently cooling the rails to atmospheric temperature.

3. The method of manufacturing steel rails which consists in rolling the rails to finished sections, cooling the rails from a rolling temperature of 925° C. to 1065° C. to between 500° C. and 700° C., reheating the rails to between 800° C. and 850° C. and cooling the rails to atmospheric temperature.

4. The method of manufacturing steel rails which consists in rolling the rails to finished sections, cooling the rails from the rolling temperature to approximately 500° C., reheating the rails to approximately 850° C., and cooling the rails to atmospheric temperature.

5. The method of treating heavy rolled products of rail steel which consists in rolling the products to finished sections, cooling them from their rolling temperature to a point only slightly below the thermal critical range, re-heating them to a point slightly above the thermal critical range and cooling them to atmospheric temperature.

6. The method of manufacturing heavy rolled products of rail steel which consists in rolling the products to finished sections, cooling them from the rolling temperature to below the thermal critical range, reheating them before they have reached atmospheric temperature to above the thermal critical range and subsequently cooling them to atmospheric temperature.

7. The method of manufacturing heavy rolled products of rail steel which consists in rolling the products to finished sections, cooling them from a rolling temperature of 925° C. to 1065° C. to between 500° C. and 700° C., reheating them to between 800° C. and 850° C. and cooling them to atmospheric temperature.

8. The method of manufacturing heavy rolled products of rail steel which consists in rolling the products to finished sections, cooling them from the rolling temperature to approximately 500° C., reheating them to approximately 850° C., and cooling them to atmospheric temperature.

JOHN BRUNNER.